Patented Apr. 29, 1930

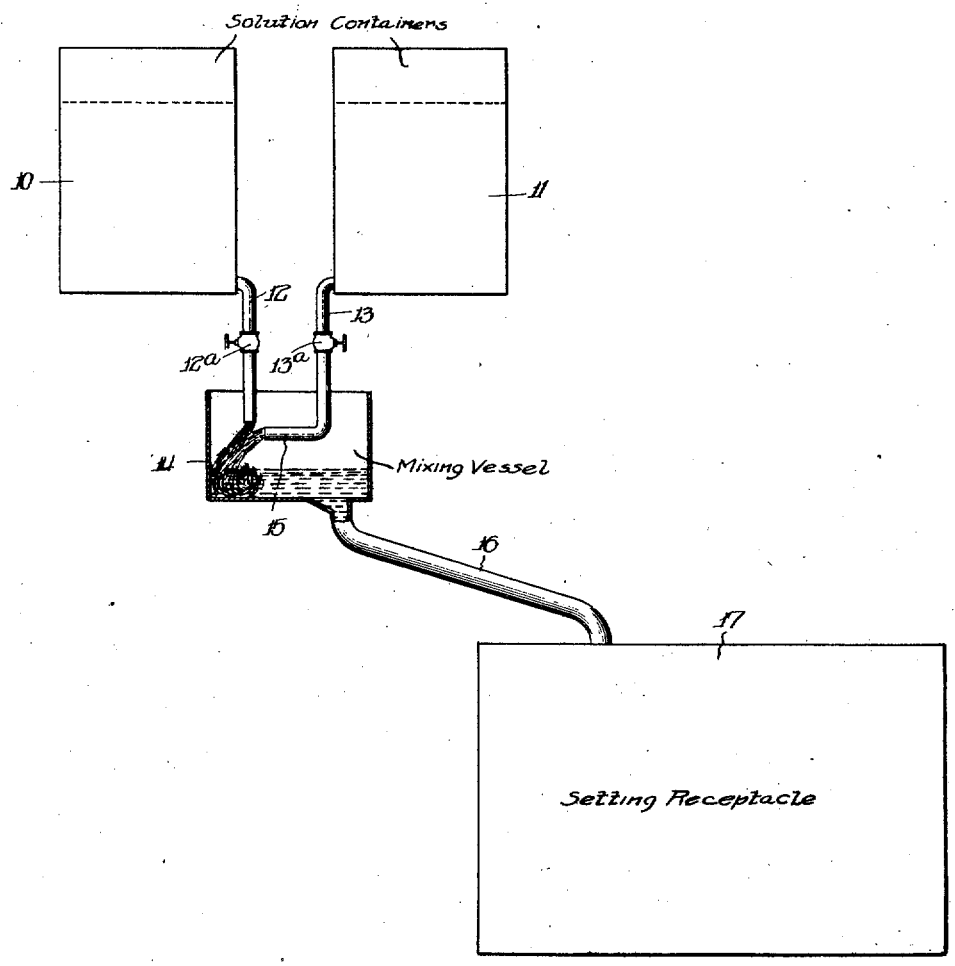

1,756,625

UNITED STATES PATENT OFFICE

ABRAHAM SIDNEY BEHRMAN, OF CHICAGO, ILLINOIS, ASSIGNOR, BY MESNE ASSIGNMENTS, TO THE PERMUTIT COMPANY, OF NEW YORK, N. Y., A CORPORATION OF DELAWARE

METHOD OF PREPARING METALLO-SILICATES

Application filed April 11, 1925. Serial No. 22,253.

The invention relates to the production of metallo-silicates, and in particular to a novel method of procedure in combining the reagents utilized in what is commonly called the wet method or precipitation process of preparing synthetic zeolites. The invention is particularly adaptable to the requirements of that class of wet method processes which involves employment of concentrated solutions of the reagents and which is typified in the process forming the subject-matter of my former Patent No. 1,515,007 of November 11, 1924.

Incidental to the use of concentrated solutions of the selected reagents, is the almost immediate formation of a gel which embraces substantially all of the constituents of the component solutions. In view of the rapidity with which reaction takes place and formation of the gel is effected, it is essential that care be taken in the mixing to avoid what might be called preliminary or intermediate reactions which must later be overcome, and to insure that the reaction mass throughout shall constitute a homogeneous precipitate of predetermined composition.

I have found that the ordinary methods of mixing are not conducive to obtaining a product possessing the desired characteristics. Particularly objectionable is the usual method of adding one solution to the bulk of the other, even though the addition is accompanied by vigorous stirring. Assuming that it is proposed to add a solution of sodium silicate to a solution of aluminum sulphate in proper proportion to produce a base exchange material, it is inevitable that during the first stages of the mixing there will be formed hydrated aluminum silicates of variable composition, and that in order to attain the anticipated sodium aluminum silicate, further reaction must result on addition of the remainder of the silicate solution. When the intermediate products are precipitated, which will occur under certain conditions, the subsequent conversion of these to the desired end product is extremely difficult. Similar conditions will prevail upon addition of the aluminum sulphate to the sodium silicate.

The difficulties referred to are accentuated when concentrated solutions are employed, due to the rapidity of the precipitation and the firmness of the gel that is formed. If a relatively large proportion of aluminum sulphate is to be used in the endeavor to increase the density of the final product, there is the possibility that in some portion of the gel the alkali will have been completely neutralized and the corresponding product will have no base exchanging property.

These and other objections to prior procedure in the mixing of quick reacting solutions to obtain a precipitate in the form of a gel will be overcome by the present invention which, generally stated, comprises the progressive flowing together of constituent parts of the reacting solutions in the proper proportions to attain the desired combination. In order that the invention may be better understood, I present in the accompanying drawings a diagrammatic sketch of apparatus suitable for practicing the invention.

In the drawing the numerals 10 and 11 represent tanks or vessels for holding the solutions to be mixed. Each of these tanks has an orifice at the bottom thereof, to which are connected respectively the pipes 12 and 13, both of which lead to a mixing chamber 14. The flow through pipe 12 is controlled by the cock 12ª and that through pipe 13 by the similar cock 13ª. One of these pipes, in the sketch the pipe 12, preferably discharges vertically into the mixing chamber and the other has on its lower end a horizontal extension 15 so arranged as to discharge the fluid passing therethrough directly into the path of the liquid flowing from the pipe 12.

The tanks, orifices and pipes may be proportioned to discharge the solutions in any desired ratio.

A draw-off pipe 16 leads from the bottom of the mixing chamber to a suitable receptacle 17 in which the compound sets to a firm gel.

As an example of operation, let us assume that the tanks 10 and 11 are of equal dimension and that the pipes 12 and 13 and the orifices in the respective tanks are proportioned to permit equal withdrawal of the solution. Let us further assume that 75 liters of an aqueous solution of commercial aluminum sulphate containing 70 grams per liter is placed in the vessel 10 and that 21.3 kg. of commercial water glass diluted to 75 liters with water is placed in the vessel 11. The cocks 12$^a$ and 13$^a$ are now opened, whereupon the solutions will discharge at the same rate through the pipes 12 and 13 and flow together adjacent the discharge ends of the said pipes within the mixing chamber 14. Inasmuch as the reaction and the formation of a gel follows soon after mixing, it is desirable that the material shall remain within the chamber 14 only long enough to accomplish a fairly uniform commixing of the solutions, which is attained by the turbulence produced by their discharge in the mixing chamber. A quick escape is provided through the pipe 16 and by the time the outlet into the receptacle 17 is reached the reaction has been completed and the compound is in condition for setting, which takes place in the receptacle 17 during the continuing influx of more of the material into the receptacle. After setting, the gel is dried and broken up.

Modification of apparatus and proportioning thereof to meet the requirements of any particular practice is well within the skill of those versed in the art.

While the chief object of this invention is the provision of a method of mixing liquids of the nature described, which will insure a homogeneous product of predetermined chemical composition, there are several other advantages which may be derived from its use. For example, I am able to employ successfully considerably stronger solutions than would be possible with the usual method of mixing, thereby effecting material economies in handling and drying the product.

A further advantage accruing from the use of this procedure is that higher mixing temperatures may safely be employed. In the example cited in my Patent No. 1,515,007 I state that the solutions are preferably cooled to about 5° C., in order that fluidity be retained sufficiently long to provide for thorough mixing and subsequent handling. By using the method of the present invention, however, thorough and uniform mixing is accomplished so quickly that an extended period of fluidity is not required. In consequence, the procedure may be carried on at higher temperatures, such as normal room temperatures, thus eliminating the necessity for refrigeration and the equipment required therefor.

I claim:

1. In the manufacture of gels by interaction of concentrated reacting solutions, the process which comprises contacting two such solutions together in small proportionate amounts in a coalescing flow, continuing the flow and effecting mixing in transit, collecting the flowing mixture in a receiver and allowing development of gel in said receiver.

2. In the manufacture of gel zeolites by admixture of a solution containing silicate with a solution containing alumina, the process which comprises flowing small proportioned streams of the silicate solution and of the alumina containing solution into mutual contact in interfering jets, completing the mixture in transit, collecting the mixture thus produced and delivering it through a conduit to a receiver, and allowing development of gel in said receiver.

3. The method of preparing uniform gels from solutions adapted to react quickly to form thick gelatinous precipitates, which comprises coalescing relatively small proportionate quantities of the solutions employed, effecting mixture of the solutions while in transit, coalescing the small quantities of mixed solutions and allowing the resulting mixture to set to a gel.

In testimony whereof I have hereunto signed my name.

ABRAHAM SIDNEY BEHRMAN.